United States Patent
Huei (10) Patent No.: US 7,331,362 B2
(45) Date of Patent: Feb. 19, 2008

(54) VALVE CAPABLE OF CONTROLLING WATER DISCHARGE

(75) Inventor: Ouyang Huei, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 245 days.

(21) Appl. No.: 11/168,493

(22) Filed: Jun. 29, 2005

(65) Prior Publication Data

US 2007/0000546 A1    Jan. 4, 2007

(51) Int. Cl.
*E03C 1/12* (2006.01)
*F16K 11/044* (2006.01)

(52) U.S. Cl. .................................... 137/597; 137/625.5
(58) Field of Classification Search ................ 137/597, 137/625.5 X, 625.48, 119.03, 119.04, 119.05, 137/872
See application file for complete search history.

(56) References Cited

U.S. PATENT DOCUMENTS

| | | | | | |
|---|---|---|---|---|---|
| 1,228,453 | A | * | 6/1917 | Lehnert | ...................... 137/597 |
| 1,575,771 | A | * | 3/1926 | King | ........................ 137/625.5 |
| 1,937,246 | A | * | 11/1933 | Reedy | ...................... 137/625.5 |
| 3,297,046 | A | * | 1/1967 | Hall | ....................... 137/119.05 |
| 4,182,374 | A | * | 1/1980 | Spanides | ................ 137/625.48 |
| 4,874,006 | A | * | 10/1989 | Iqbal | ....................... 137/119.05 |
| 4,989,640 | A | * | 2/1991 | Steffes et al. | ............. 137/625.5 |
| 6,182,700 | B1 | * | 2/2001 | Hannemann et al. | ........ 137/872 |

* cited by examiner

Primary Examiner—Stephen M. Hepperle
(74) Attorney, Agent, or Firm—Troxell Law Office, PLLC (57) ABSTRACT

A valve includes a hollow pipe defining a first opening and a second opening aligning with each other. A first passage, a second passage, a third passage and a fourth passage are respectively defined in an inner surface of the hollow pipe and communicate with each other. A piston is received in the hollow pipe and forms a first flange and a second flange thereon. A first stop is formed above the first flange and has long sides and short sides. A second stop is formed below the second flange and has long sides and short sides. The first flange and the second flange blocking the third passage and the fourth passage depends on the short sides/long sides being aligned with the third passage and the fourth passage, whereby water discharge path is controlled easily and exactly.

16 Claims, 9 Drawing Sheets

VALVE CAPABLE OF CONTROLLING WATER DISCHARGE

BACKGROUND OF THE INVENTION

1. Field of the Invention

The present invention relates to a valve, and particularly to a valve having two outlets and controlling water discharge selectively through one or both outlets.

2. Related Art

Figure 7:
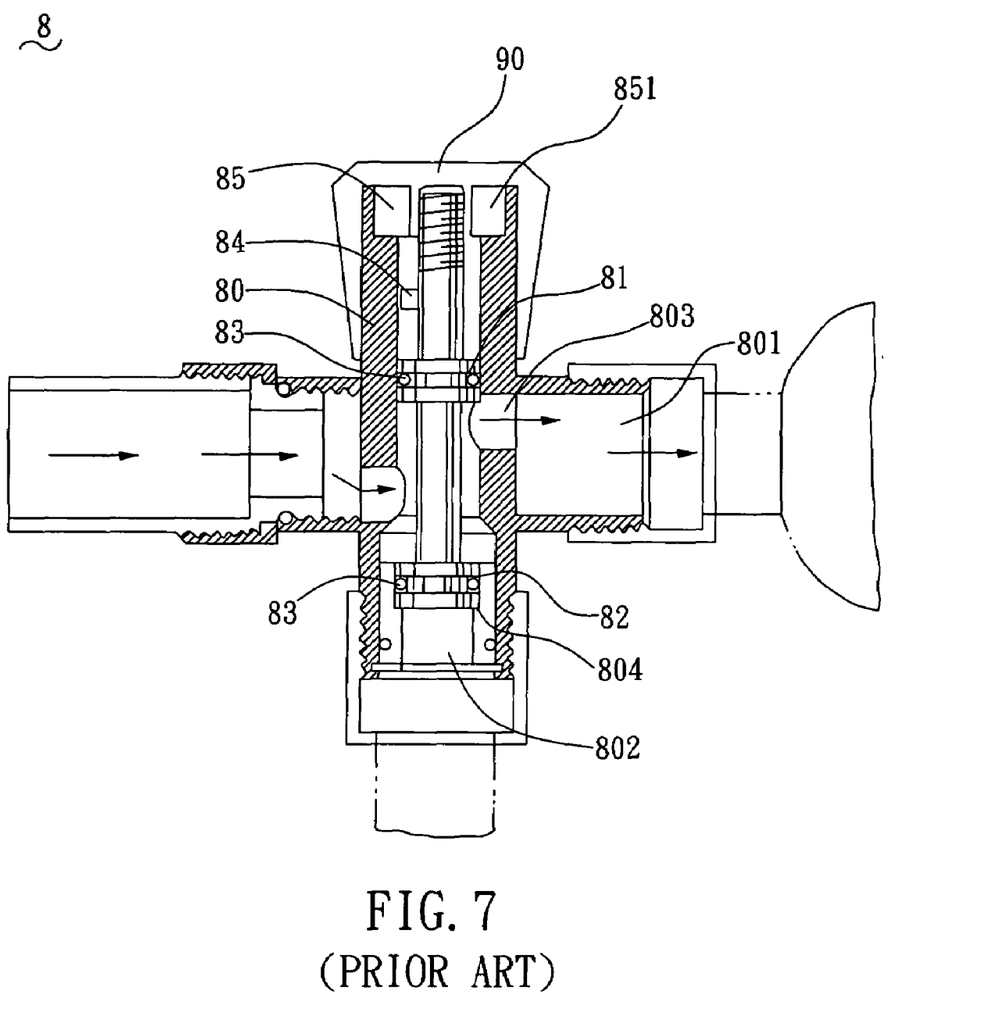
FIGS. 7-9 show the operations of a conventional valve controlling water discharge.
Figure 8:
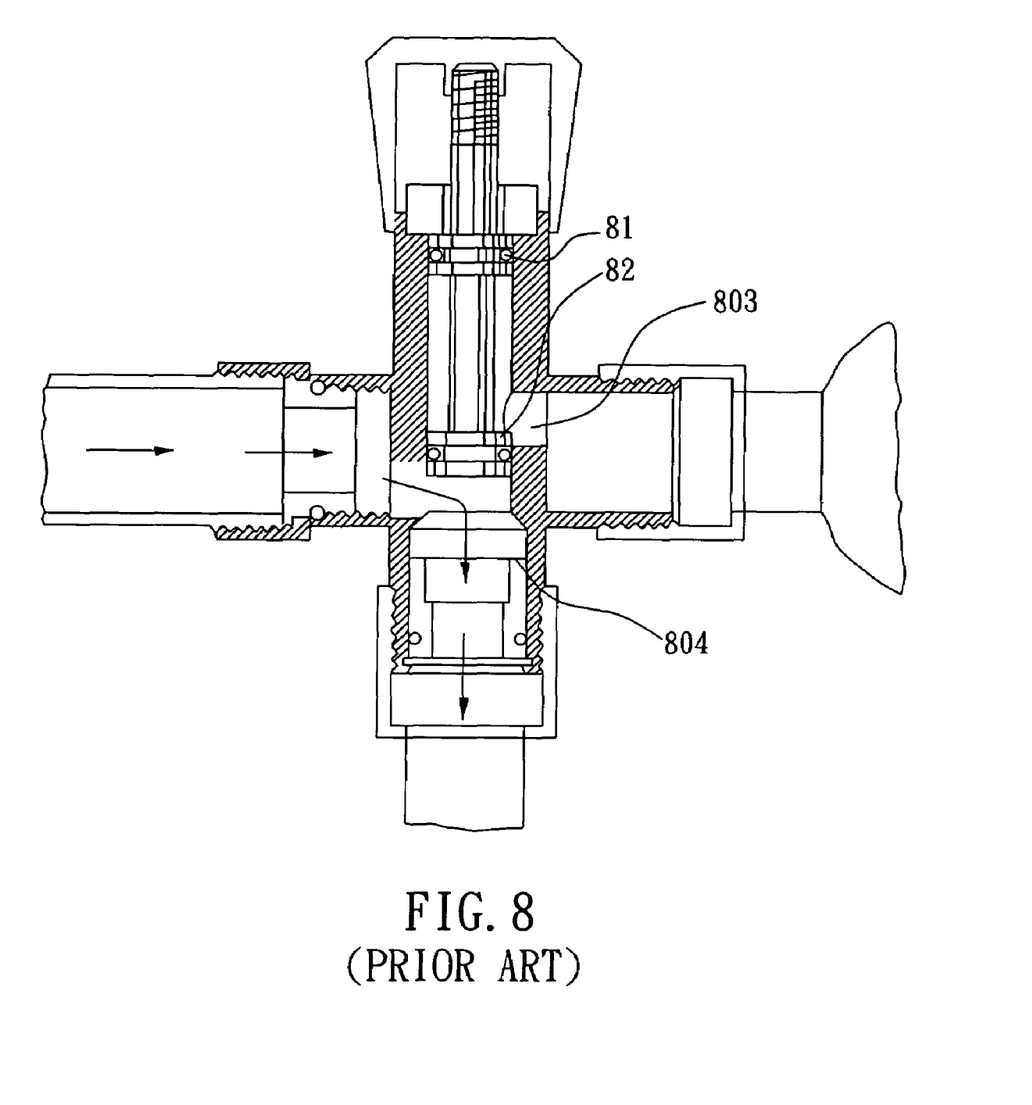
Figure 9:
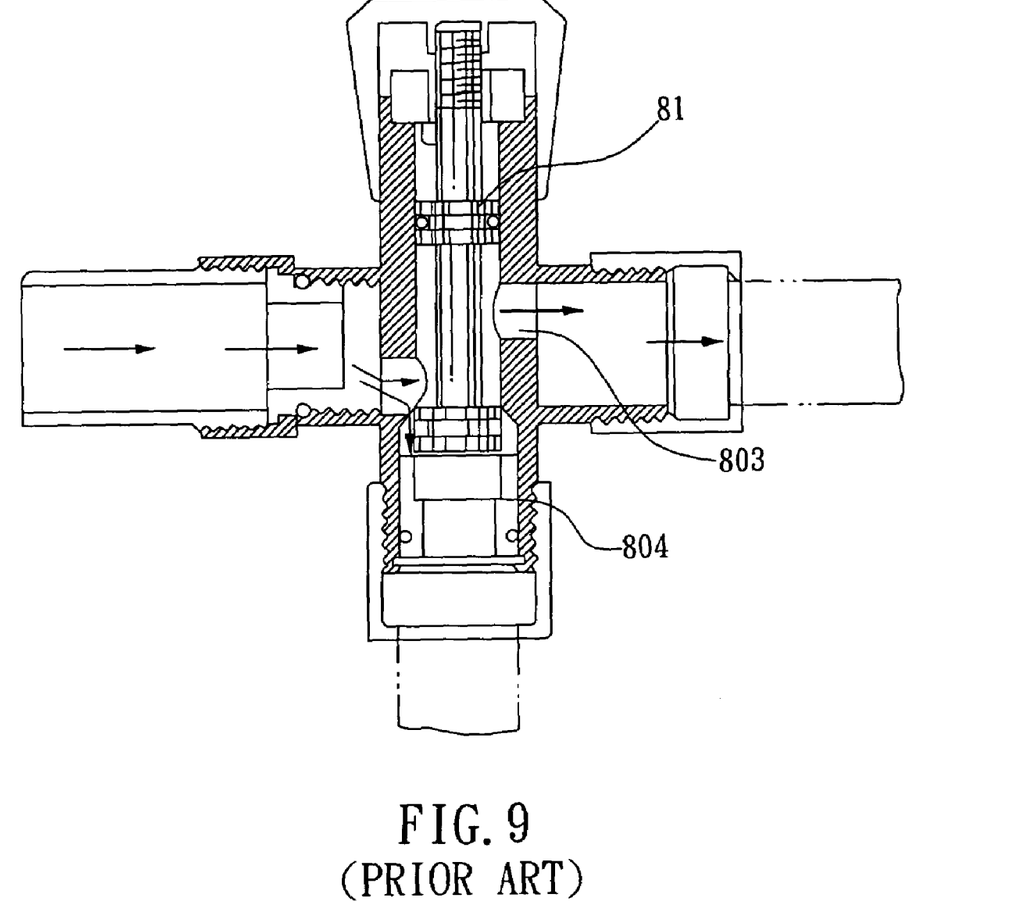

In prior art, valves which have function of controlling water discharge, are commonly assembled on water discharge paths of bathroom for controlling water discharge. Such a design is disclosed in U.S. Pat. No. 6,279,610. As shown in FIG. 7, a valve 8 includes a plunger 80 forming a top flange 81 and a bottom flange 82. Leakage-proof gaskets 83 are respectively disposed adjacent to the top flange 81 and the bottom flange 82. A peg 84 and a spacer 85 are provided to position the plunger 80. A tip of the plunger 80 is secured to a knob 90. Upon turning, pulling or pressing the knob 90, the peg 84 biases against a top or a bottom of the spacer 85 for controlling water discharge. Further referring to FIGS. 8 and 9, in normal state, the bottom flange 82 blocks a second neck 804 of a second outlet 802, and water flows out from a first outlet 801 (shown in FIG. 7). In a second flow mode, water flows out from the second outlet 802, as shown in FIG. 8. The knob 90 is pulled upward and rotates. The peg 84 extends through a slot 851 of the spacer 85, and then rotates and presses downward until straddling over the spacer 85. The peg 84 displaces upward and is apart from the second neck 804, and blocks a first neck 803 of the first outlet 801. Thus, water flows out from the second outlet 802, as shown in FIG. 8. In a third flow mode, water flows out from both the first outlet 801 and the second outlet 802, as shown in FIG. 9. Provided that the valve 8 is in normal state of FIG. 7, the knob 90 is pulled upward until the peg 84 biases against the bottom of the spacer 85. Neither the first neck 803 nor the second neck 804 is blocked by the top flange 81 or the bottom flange 82. Thus, water flows from both the first outlet 801 and the second outlet 802, as shown in FIG. 9. Provided that the valve 8 is in the second flow mode of FIG. 8, the knob 90 rotates until the peg 84 is aligned with the slot 851 of the spacer 85. Then the knob 90 is pressed downward until the peg 84 extends through the spacer 85. The knob 90 rotates and moves upward slightly, and water pressure urges the peg 81 to abut against the bottom of the spacer 85. Neither the first neck 803 nor the second neck 804 is blocked by the top flange 81 or the bottom flange 82. Thus, water flows from both the first outlet 801 and the second outlet 802, as shown in FIG. 9.

However, the valve 8 of U.S. Pat. No. 6,279,610 has the following deficiencies.

Firstly, operation is bothering. As described above, the knob 90 is manually operated to make the peg 84 extend through the slot 851 of the spacer 85. Alignment of the peg 84 and the slot 851 is necessary, and at the same time, is operated only by users' feeling, complicating the operation.

Secondly, Positioning for water discharge is inexact. As shown in FIG. 9, water flows through both the first outlet 801 and the second outlet 802. In the event that water pressure alters, the bottom flange 82 nearby the second neck 804 may be pushed downward and obstructs from water flowing from the second outlet 802 smoothly.

SUMMARY OF THE INVENTION

Accordingly, an object of the present invention is to provide a valve for controlling water discharge, which is easily operates and which is reliably and exactly controls water discharge.

The valve of the present invention comprises a hollow pipe defining a first opening and a second opening aligning with each other. A first outlet and a second outlet are respectively associated with the hollow pipe and are arranged in different direction and at different height. A first passage, a second passage and a third passage are respectively defined in an inner surface of the hollow pipe, the first passage communicating with the first outlet, the second passage communicating with the second outlet, and the third passage communicating with the first opening and the second opening. A sleeve is fixed inside the hollow pipe and corresponding to the first outlet. A fourth passage is defined in an inner surface of the sleeve and corresponding to the third passage. A piston is received in the hollow pipe. A first end of the piston extends through the first opening, and a second end of the piston forms a first flange and a second flange thereon. A first stop is formed above the first flange and has long sides and short sides. A second stop is formed below the second flange and has long sides and short sides. As for a first discharge mode, the short sides of the second stop are aligned with the third passage. The second flange blocks the third passage. Water flows out of the third passage and only through the first outlet. As for a second discharge mode, the long sides of the first stop are aligned with the fourth passage. The first flange blocks the fourth passage. Water flows out of the third passage and only through the second outlet. As for a third discharge mode, the short sides of the second stop offset apart from the third passage. The second flange is stopped by the long sides of the second stop and fails to block the third passage. A space is provided between the second flange and the third passage, and water flows out of the third passage and the fourth passage, thereby discharging through both the first outlet and the second outlet.

The third passage has width different from width of the fourth passage. Width of the short sides of the first stop and the second stop are roughly equal to the smaller width between the third passage and the fourth passage. Width of the long sides of the first stop and the second stop are roughly equal to the larger width between the third passage and the fourth passage. The first stop is located at 45° angle with respect to the second stop. Long sides/short sides of one of the first stop and the second stop is apart from one of the third passage and the fourth passage when short sides/long sides of the other one of first stop and the second stop is aligned with the other one of the third passage and the fourth passage.

DESCRIPTION OF THE PREFERRED EMBODIMENTS

Figure 1:
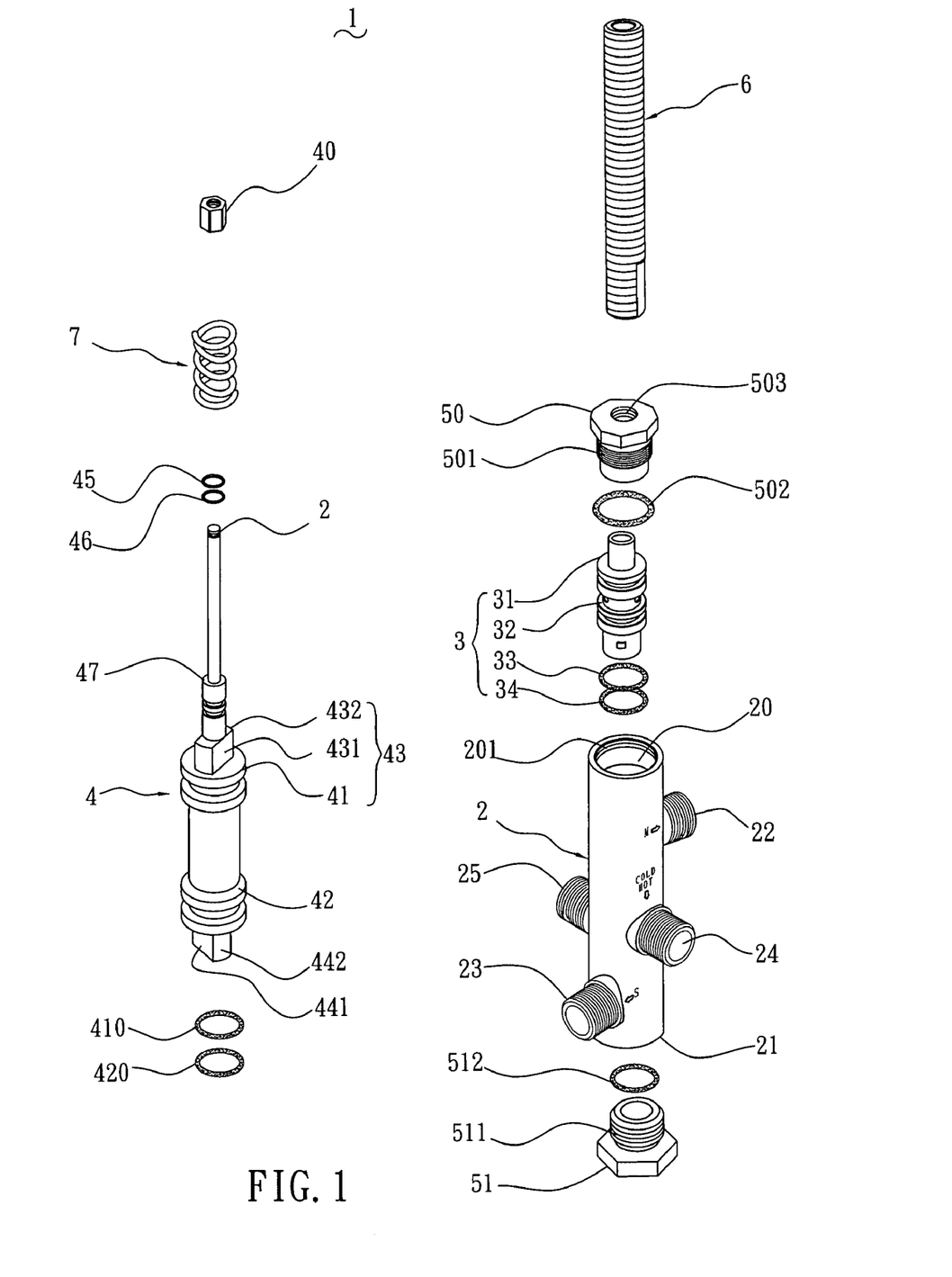
FIG. 1 is an exploded view of a valve of the present invention.
Figure 2:
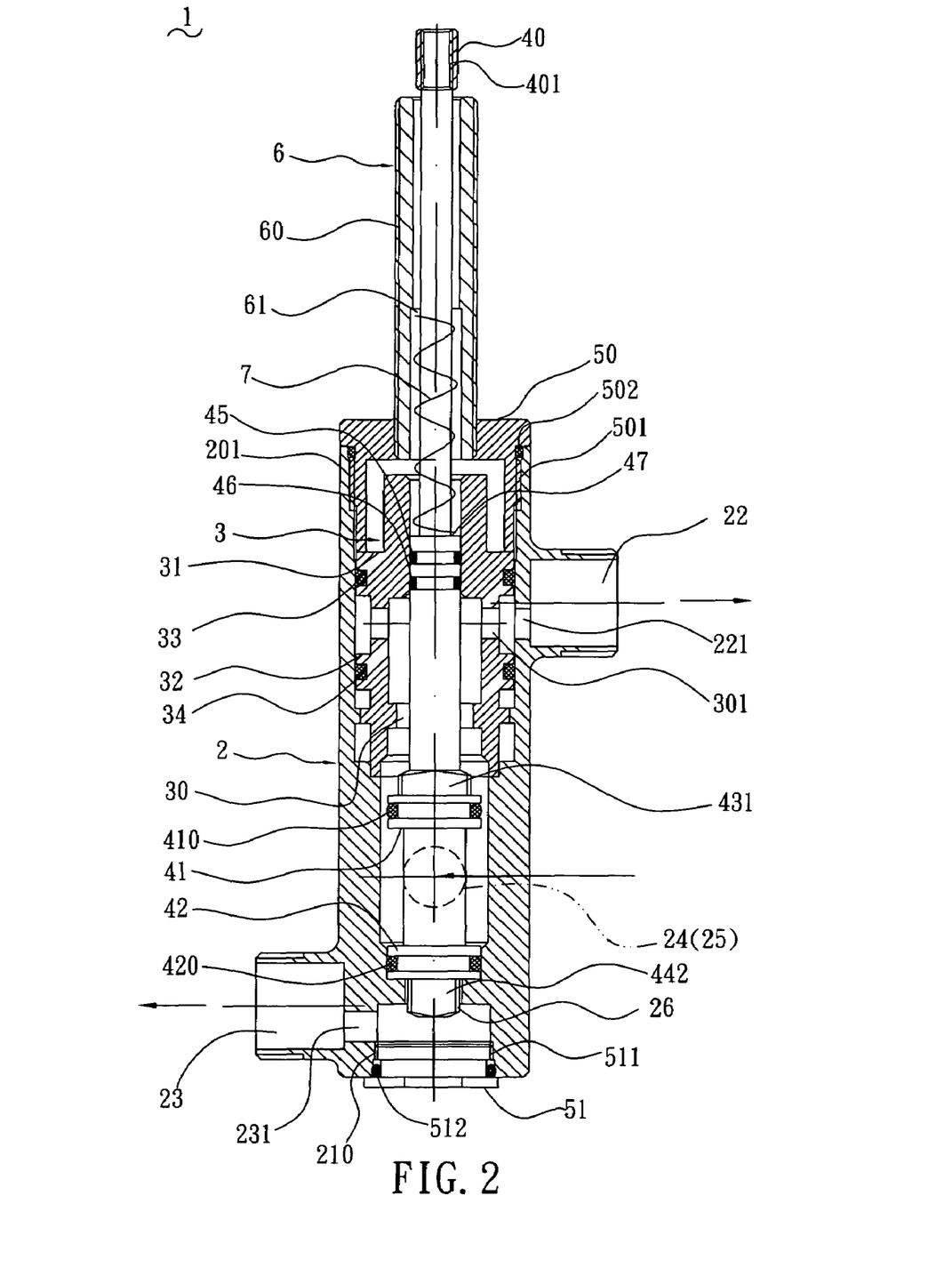
FIGS. 2-4 show the operations of the valve controlling water discharge.

With reference to FIGS. 1 and 2, a valve 1 in accordance with the present invention comprises a hollow pipe 2, a leakage-proof sleeve 3, a piston 4, a top cover 50, a bottom cover 51, a link lever 6 and a compressed spring 7. The hollow pipe 2 stands up, and defines a first opening 20 and a second opening 21 aligning with each other. The first opening 20 forms first inner threads 201 for engaging with first outer threads 501 of the top cover 50. The second opening 21 forms second inner threads 210 for engaging with second outer threads 511 of the bottom cover 51. A first outlet 22 and a second outlet 23 are respectively associated with the hollow pipe 2 and are arranged in different direction and at different height. A first inlet 24 for tap water and a second inlet 25 for hot water are respectively distributed between the first outlet 22 and the second outlet 23. The hollow pipe 2 defines a first passage 221, a second passage 231 and a third passage 26 in an inner surface thereof. The first passage 221 communicates with the first outlet 22, the second passage 231 communicates with the second outlet 23, and the third passage 26 communicates with the first opening 20 and the second opening 21.

The sleeve 3 is fixed inside the hollow pipe 2 and corresponding to the first outlet 22. The sleeve 3 is longitudinally hollow and transversely defines a through hole 301 communicating with the first passage 221. A fourth passage 30 is defined in an inner surface of the sleeve 3 and near the second outlet 23, and corresponds to the third passage 26. Projections 31, 32 are respectively formed on an outer surface of the sleeve 3, and leakage-proof rings 33, 34 are disposed on the projections 31, 32.

The piston 4 is slidably received in the hollow pipe 2, and both ends thereof are carved. A first end (not labeled) of the piston 4 extends through the first opening 20 and defines piston threads 401 for fastening to a screw cap 40. A second end (not labeled) of the piston 4 forms a first flange 41 and a second flange 42 thereon, and leakage-proof rings 410, 420 are disposed on the first flange 41 and the second flange 42 for preventing against leakage. A first stop 43 is formed above the first flange 41, and has long sides 431 and short sides 432. A second stop 44 is formed below the second flange 42, and has long sides 441 and short sides 442. The first stop 43 is located at 45° angle with respect to the second stop 44. The third passage 26 has width different from the width of the fourth passage 30. The short sides 432, 442 have width roughly equal to the smaller width between the third passage 26 and the fourth passage 30. The long sides 431, 441 have width roughly equal to the larger width between the third passage 26 and the fourth passage 30. In this embodiment, the width of the third passage 26 is smaller than the width of the fourth passage 30. The short sides 432, 442 have width roughly equal to the width of the third passage 26. The long sides 431, 441 have width roughly equal to the width of the fourth passage 30. Thus water discharge path depends on alignment of the short sides 432, 442 with the third passage 26 and the fourth passage 30. One of the first stop 43 and the second stop 44 is apart from one of the third passage 26 and the fourth passage 30 when the other one of first stop 43 and the second stop 44 is aligned with the other one of the third passage 26 and the fourth passage 30. This will be depicted hereinafter combining with FIGS. 2 through 4. A shoulder 47 is formed on the piston 4 for abutting against an end of the compressed spring 7.

The top cover 50 is assembled on the first opening 20, and the bottom cover 51 is assembled on the second opening 21. Leakage-proof rings 502, 512 are respectively mounted on the top cover 50 and the bottom cover 51. The top cover 50 further defines an assembling hole 503 for mounting the link lever 6.

The link lever 6 is hollow, and both ends thereof are carved. The link lever 6 forms lever threads 60 on an end thereof for screwing to the assembling hole 503 of the top cover 50. A protrusion 61 is formed on an inner surface of the link lever 6 for biasing against an end of the compressed spring 7. The compressed spring 7 is assembled between the piston 4 and the link lever 6. One end of the compressed spring 7 biases against the piston 4 while the other end thereof biases against the protrusion 61 of the link lever 6 for providing the piston 4 with return force. Leakage-proof rings 45, 46 are disposed on the piston 4 and nearby the compressed spring 7.

Figure 3:
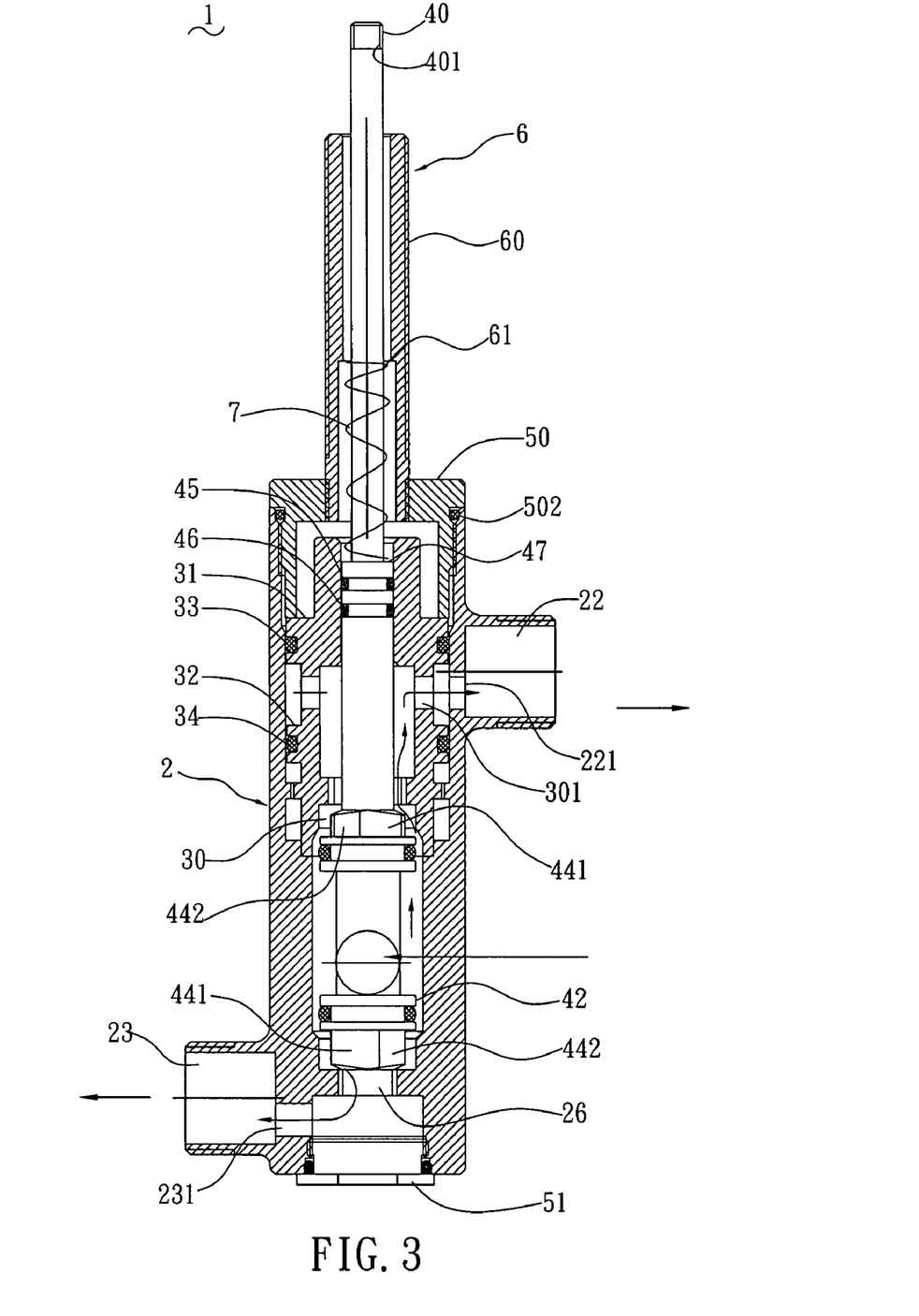
Figure 4:
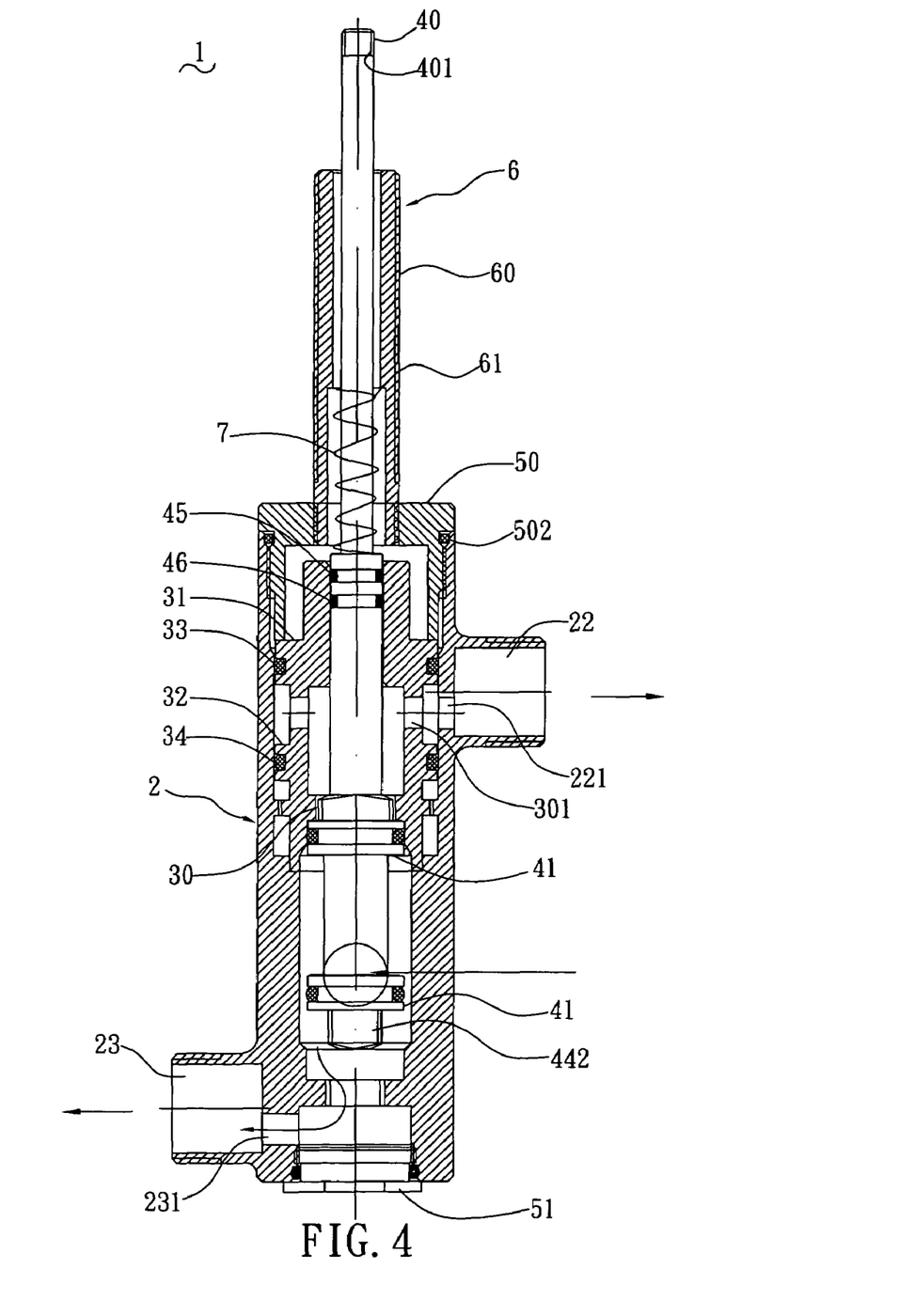

Further referring to FIGS. 2 through 4, the valve 1 controls water discharge selectively through the first outlet 22, or the second outlet 23, or both the first outlet 22 and the second outlet 23.

As shown in FIG. 2, in normal state, the piston 4 is located in such a way that the short sides 442 of the second stop 44 are aligned with the third passage 26. The second flange 42 blocks the third passage 26, thus water flows through the first outlet 22.

As shown in FIG. 3, the piston 4 is pulled upward and turns 45° angle. The short sides 442 of the second stop 44 offset apart from the third passage 26. The second flange 42 is stopped by the long sides 441 of the second stop 44 and fails to block the third passage 26. A space is provided between the second flange 42 and the third passage 26. Water flows out of the third passage 26 and the fourth passage 30, thereby discharging through both the first outlet 22 and the second outlet 23.

As shown in FIG. 4, the piston 4 is further pulled upward and turns 45° angle. Further owing to water pressure, the long sides 431 of the first stop 43 are aligned with the fourth passage 30. The first flange 42 blocks the fourth passage 30. Water flows simply through the second outlet 23.

Figure 5:
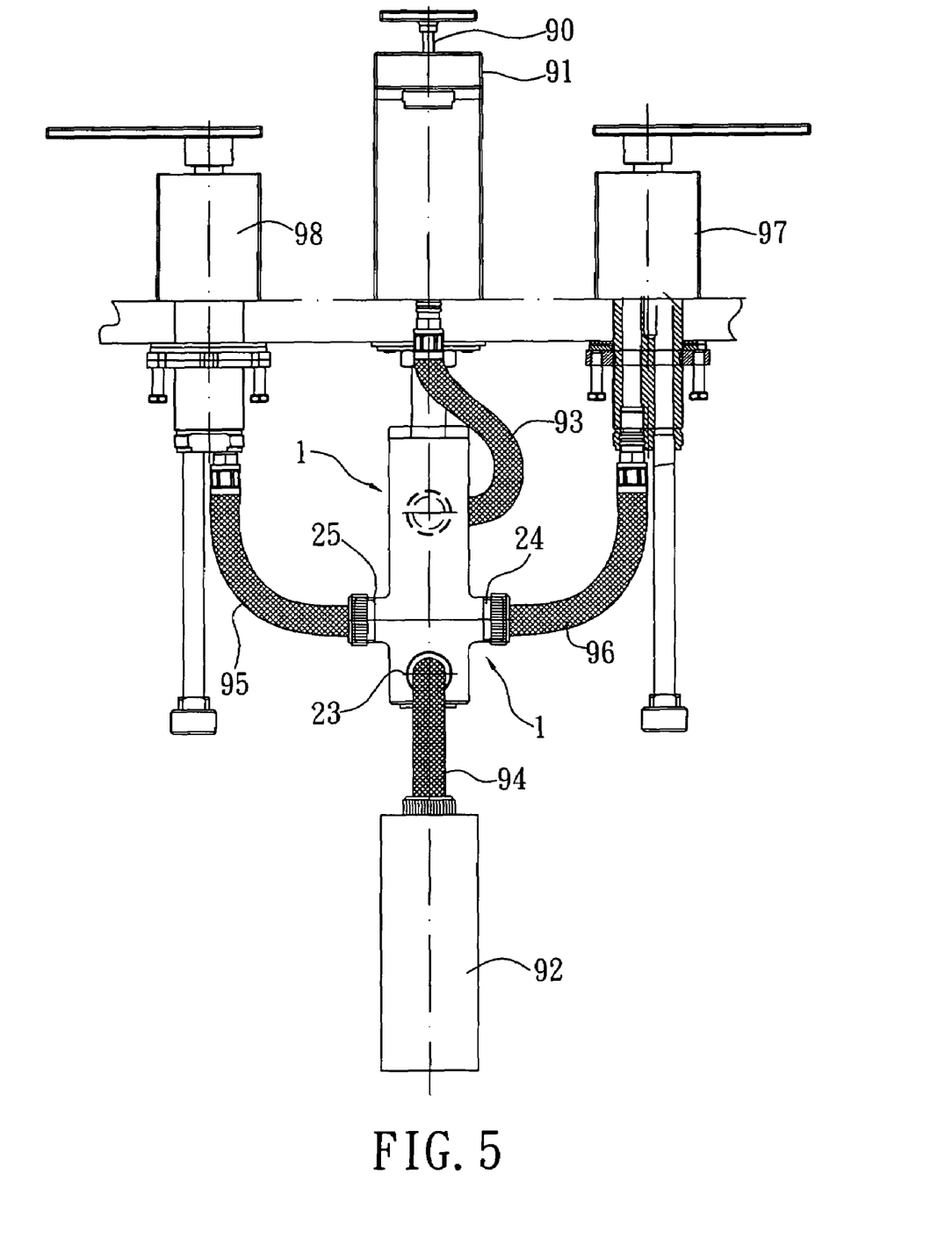
FIGS. 5-6 show the valve being mounted on a faucet assembly.
Figure 6:
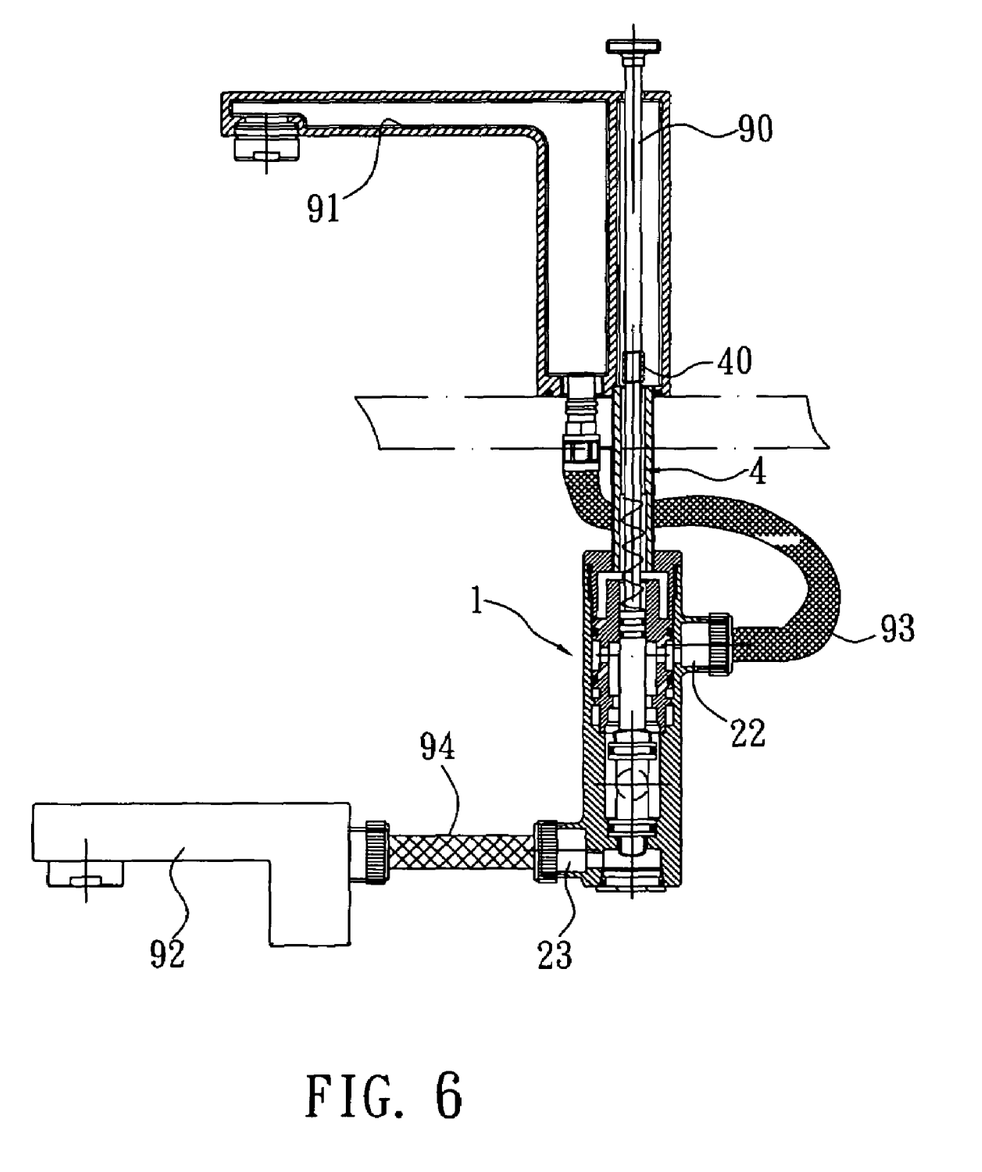

FIGS. 5 and 6 show the valve 1 applied on a faucet assembly which includes two faucets. One end of the piston 4 is screwed to an actuator 90 of the faucet assembly by means of the screw cap 40. The first outlet 22 of the valve 1 connects with a first faucet 91 of the faucet assembly through a pipe 93, and the second outlet 23 of the valve 1 connects with a second faucet 92 of the faucet assembly through a pipe 94. The first inlet 24 of the valve 1 connects with a first handle 97 of the faucet assembly through a pipe 95 for providing tap water. The second inlet 25 of the valve 1 connects with a second handle 98 of the faucet assembly through a pipe 96 for providing hot water. In normal state, further referring to FIG. 2, water flows from the first faucet 91 when turning on the first handle 97 and the second handle 98. Further referring to FIG. 3, water flows from both the first faucet 91 and the second faucet 92 when the actuator 90 is pulled upward and turns 45°. Further referring to FIG. 4, water flows only from the second faucet 92 when the actuator 90 is further pulled upward and turns 45°. So the valve 1 of the present invention facilitates operation of a faucet assembly. Moreover, hot water discharging from the second faucet 92 is controlled by the actuator 90 which is mounted on the first faucet 91 far from children, thereby preventing children from scald by hot water and allowing children to use the second faucet simultaneously. In another embodiment of the present invention, which is not shown in the drawings, a fourth passage of the valve is defined in the inner surface of hollow pipe instead of the sleeve, and communicates with the first opening and the second opening. The leakage-proof sleeve 3 of the instant embodiment in the drawings may be omitted.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A valve capable of controlling water discharge, comprising:

a hollow pipe defining a first opening and a second opening aligning with each other, a first outlet and a second outlet being respectively associated with the hollow pipe and being arranged in different direction and at different height, at least an inlet being distributed between the first outlet and the second outlet, a first passage, a second passage and a third passage being respectively defined in an inner surface of the hollow pipe, the first passage communicating with the first outlet, the second passage communicating with the second outlet, and the third passage communicating with the first opening and the second opening;

a sleeve fixed inside the hollow pipe and corresponding to the first outlet, the sleeve being longitudinally hollow and transversely defining a through hole communicating with the first passage, a fourth passage being defined in an inner surface of the sleeve and located between the first outlet and the second outlet, the fourth passage selectively communicating with the third passage, at least a projection being formed on an outer surface of the sleeve, and leakage-proof rings being disposed on the at least projection;

a piston received in the hollow pipe and having carved ends, a first end of the piston extending through the first opening and fastening to a screw cap, a second end of the piston forming a first flange and a second flange thereon, leakage-proof rings being disposed on the first flange and the second flange, a first stop being formed above the first flange and having long sides and short sides for aligning with the fourth passage, a second stop being formed below the second flange and having long sides and short sides for aligning with the third passage;

a top cover and a bottom cover respectively assembled on the first opening and the second opening, leakage-proof rings being respectively mounted on the top cover and the bottom cover, the top cover further defining an assembling hole; and a hollow link lever having carved ends, and an end thereof for screwing to the assembling hole of the top cover.

2. The valve capable of controlling water discharge as claimed in claim 1, wherein the third passage has width different from width of the fourth passage, width of the short sides of the first stop and the second stop being roughly equal to the smaller width between the third passage and the fourth passage, width of the long sides of the first stop and the second stop being roughly equal to the larger width between the third passage and the fourth passage, wherein the first stop is located at 45° angle with respect to the second stop, and wherein one of the first stop and the second stop is apart from one of the third passage and the fourth passage when the other one of first stop and the second stop is aligned with the other one of the third passage and the fourth passage.

3. The valve capable of controlling water discharge as claimed in claim 1, further comprising a compressed spring assembled between the piston and the link lever, one end of the compressed spring biasing against the piston while the other end thereof biasing against a protrusion on an inner surface of the link lever.

4. The valve capable of controlling water discharge as claimed in claim 3, wherein leakage-proof rings are disposed on the piston and nearby the compressed spring.

5. The valve capable of controlling water discharge as claimed in claim 3, wherein a shoulder is formed on the piston for abutting against an end of the compressed spring.

6. The valve capable of controlling water discharge as claimed in claim 1, wherein the at least an inlet comprises a first inlet for tap water and a second inlet for hot water.

7. The valve capable of controlling water discharge as claimed in claim 1, wherein the top cover forms first outer threads, and the first opening forms first inner threads for engaging with the first outer threads of the top cover, and wherein the bottom cover forms second outer threads, and the second opening forms second inner threads for engaging with the second outer threads of the bottom cover.

8. The valve capable of controlling water discharge as claimed in claim 1, wherein the hollow pipe stands up.

9. A valve capable of controlling water discharge, comprising:

a hollow pipe defining a first opening and a second opening aligning with each other, a first outlet and a second outlet being respectively associated with the hollow pipe and being arranged in different direction and at different height, at least an inlet being distributed between the first outlet and the second outlet, a first passage, a second passage, a third passage and a fourth passage being respectively defined in an inner surface of the hollow pipe, the first passage communicating with the first outlet, the second passage communicating with the second outlet, and the third passage and the fourth passage communicating with the first opening and the second opening;

a piston received in the hollow pipe, a first end of the piston extending through the first opening and fastening to a screw cap, a second end of the piston forming a first flange and a second flange thereon, leakage-proof rings being disposed on the first flange and the second flange, a first stop being formed above the first flange and having long sides and short sides, a second stop being formed below the second flange and having long sides and short sides;

a top cover and a bottom cover respectively assembled on the first opening and the second opening, leakage-proof rings being respectively mounted on the top cover and the bottom cover, the top cover further defining an assembling hole; and a hollow link lever having carved ends, and an end thereof screwing to the assembling hole of the top cover.

10. The valve capable of controlling water discharge as claimed in claim 9, wherein the third passage has width different from width of the fourth passage, width of the short sides of the first stop and the second stop being roughly equal to the smaller width between the third passage and the fourth passage, width of the long sides of the first stop and the second stop being roughly equal to the larger width between the third passage and the fourth passage, wherein the first stop is located at 45° angle with respect to the second stop, and wherein one of the first stop and the second stop is apart from one of the third passage and the fourth passage when the other one of first stop and the second stop is aligned with the other one of the third passage and the fourth passage.

11. The valve capable of controlling water discharge as claimed in claim 9, further comprising a compressed spring assembled between the piston and the link lever, one end of the compressed spring biasing against the piston while the other end thereof biasing against a protrusion on an inner surface of the link lever.

12. The valve capable of controlling water discharge as claimed in claim 10, wherein leakage-proof rings are disposed on the piston and nearby the compressed spring.

13. The valve capable of controlling water discharge as claimed in claim 10, wherein a shoulder is formed on the piston for abutting against an end of the compressed spring.

14. The valve capable of controlling water discharge as claimed in claim 9, wherein the at least an inlet comprises a first inlet for tap water and a second inlet for hot water.

15. The valve capable of controlling water discharge as claimed in claim 9, wherein the top cover forms first outer threads, and the first opening forms first inner threads for engaging with the first outer threads of the top cover, and wherein the bottom cover forms second outer threads, and the second opening forms second inner threads for engaging with the second outer threads of the bottom cover.

16. The valve capable of controlling water discharge as claimed in claim 9, wherein the hollow pipe stands up.

* * * * *